United States Patent
Zegers

(10) Patent No.: US 8,111,819 B2
(45) Date of Patent: Feb. 7, 2012

(54) MESSAGE SERVER AND METHOD FOR NOTIFICATION OF A USER ABOUT THE DELIVERY OF AN ELECTRONIC MESSAGE

(75) Inventor: John Zegers, Kerkrade (NL)

(73) Assignee: Cycos Aktiengesellschaft, Alsdorf (DE)

( * ) Notice: Subject to any disclaimer, the term of this patent is extended or adjusted under 35 U.S.C. 154(b) by 1390 days.

(21) Appl. No.: 11/708,151

(22) Filed: Feb. 16, 2007

(65) Prior Publication Data
US 2007/0201629 A1 Aug. 30, 2007

(51) Int. Cl.
*H04M 3/42* (2006.01)
*H04W 4/00* (2009.01)

(52) U.S. Cl. .................. 379/201.12; 455/466

(58) Field of Classification Search .......... 379/201.12, 379/207.08; 455/466; 709/204, 206
See application file for complete search history.

(56) References Cited

U.S. PATENT DOCUMENTS

| | | | |
|---|---|---|---|
| 5,276,679 A * | 1/1994 | McKay et al. ............. 370/358 |
| 6,738,462 B1 * | 5/2004 | Brunson ............. 379/142.06 |
| 6,898,709 B1 * | 5/2005 | Teppler ............. 713/178 |
| 7,177,859 B2 * | 2/2007 | Pather et al. ............. 1/1 |
| 7,580,719 B2 * | 8/2009 | Karmarkar ............. 455/466 |
| 2002/0147778 A1 * | 10/2002 | Dutta ............. 709/206 |
| 2002/0178218 A1 | 11/2002 | Butlin |
| 2004/0083189 A1 * | 4/2004 | Leon ............. 705/401 |
| 2004/0143636 A1 * | 7/2004 | Horvitz et al. ............. 709/207 |
| 2004/0249890 A1 * | 12/2004 | Fellenstein et al. ............. 709/206 |
| 2004/0254985 A1 * | 12/2004 | Horstemeyer ............. 709/205 |
| 2005/0074109 A1 * | 4/2005 | Hanson et al. ............. 379/207.04 |
| 2005/0121517 A1 * | 6/2005 | Igval et al. ............. 235/385 |
| 2005/0283368 A1 * | 12/2005 | Leung ............. 704/270 |
| 2006/0002536 A1 * | 1/2006 | Ambrose ............. 379/201.01 |
| 2006/0062205 A1 * | 3/2006 | Doherty et al. ............. 370/352 |
| 2006/0288283 A1 * | 12/2006 | Schrepp et al. ............. 715/700 |
| 2007/0118647 A1 * | 5/2007 | Lee et al. ............. 709/225 |
| 2007/0223661 A1 * | 9/2007 | Baker et al. ............. 379/88.23 |
| 2007/0265838 A1 * | 11/2007 | Chopra et al. ............. 704/201 |
| 2008/0052341 A1 * | 2/2008 | Goggin ............. 709/201 |
| 2008/0155026 A1 * | 6/2008 | Daniels-Farrar et al. ...... 709/206 |
| 2008/0200152 A1 * | 8/2008 | Moore ............. 455/413 |
| 2009/0037537 A1 * | 2/2009 | Callanan et al. ............. 709/206 |
| 2009/0112664 A1 * | 4/2009 | Sprogis et al. ............. 705/7 |

FOREIGN PATENT DOCUMENTS

| | | |
|---|---|---|
| CN | 1627776 A | 6/2005 |
| EP | 1 519 287 A1 | 3/2005 |
| GB | 2 353 435 | 2/2001 |
| JP | 9200250 A | 7/1997 |
| JP | 2001189749 A | 7/2001 |
| JP | 2002055926 A | 2/2002 |
| WO | WO 2005/106847 A2 | 11/2005 |

* cited by examiner

*Primary Examiner* — Davetta W Goins
*Assistant Examiner* — Mohammad Islam
(74) *Attorney, Agent, or Firm* — Buchanan Ingersoll & Rooney PC

(57) ABSTRACT

In one aspect, a message server for processing outgoing and incoming electronic messages is provided. The server includes a receiving facility, a transmission facility, an instruction, a checking facility, and a notification facility. The receiving facility receives the electronic messages, including a first electronic message and a second electronic message. The transmission facility sends the electronic messages including the first electronic message. The instruction is allocated to the first electronic message and includes information for sending a notification message. The checking facility checks the second electronic message to determine if the second electronic message is a reply message to the first electronic message. The notification facility sends the notification message in response to the receipt of the reply message.

17 Claims, 1 Drawing Sheet

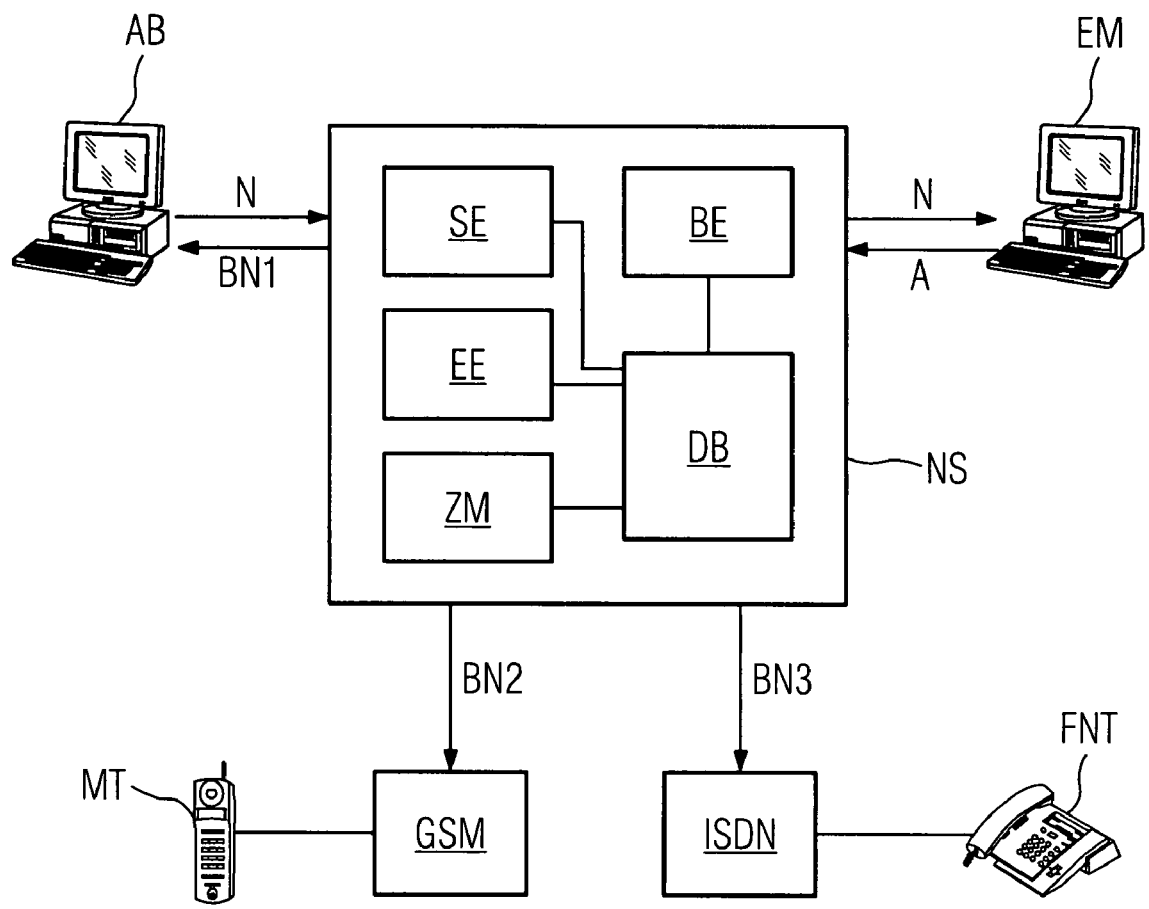

MESSAGE SERVER AND METHOD FOR NOTIFICATION OF A USER ABOUT THE DELIVERY OF AN ELECTRONIC MESSAGE

CROSS REFERENCE TO RELATED APPLICATIONS

This application claims priority of European application No. 06003850.2 EP filed Feb. 24, 2006, which is incorporated by reference herein in its entirety.

FIELD OF INVENTION

The invention relates to a message server for processing outgoing and incoming electronic messages, and a method for notification of a user about the delivery of an electronic message.

BACKGROUND OF INVENTION

For electronic communication, media and message types are often used which are stored temporarily or otherwise in a memory assigned to the respective recipient, and are retrieved by this recipient by accessing the respective memory. It is thus usual, for example, that users of an email service set up a connection now and then by means of an electronic communication device (PC, PDA, mobile phone or similar) to a corresponding message server (email server, unified messaging system or similar) to find out whether new electronic messages have arrived and been temporarily stored. As well as the email messages, this also applies in a similar way to fax messages, which are temporarily stored in corresponding fax servers or unified messaging servers, and to other electronic messages.

The regular accessing of a message server for the purpose of checking whether a new message may be present is often irksome and time-consuming. This is all the more true in the cases where a user is waiting urgently for the arrival of a message, so that he is obliged to check at very short intervals, so accordingly frequently.

To remedy this, it is known for example for the unified messaging systems to notify the relevant user (recipient of an electronic message) automatically in each case as soon as there is a new message for him. For this purpose, such servers have a facility, for example, which makes an automatically generated call to a number previously input by the user. The user is then informed about the delivery of a new electronic message, by means of a synthetically generated voice output for example. This method is often also referred to in the literature as "user outcall".

Analogously to the described method of "user outcall", known message servers are also able to execute a corresponding notification by means of a short message (SMS message; SMS=Short Message Service) over a mobile radio network.

SUMMARY OF INVENTION

Although the known notification methods are already very well able to inform users reliably and immediately about incoming electronic messages, it has proved to be a disadvantage that especially in the cases where a user receives very many electronic messages, an accordingly large number of notification messages are also sent, which is often found annoying.

It is therefore an object of the present invention to improve user convenience in the notification of incoming electronic messages.

The object is achieved with a message server and with a method according to the claims.

The solution provides the use of a message server for processing outgoing and incoming electronic messages, with a transmission facility for sending the electronic messages, with a receiving facility for receiving the electronic messages, and with a notification facility for sending a notification message about the receipt of the electronic messages. This message server has an allocation means for allocating a instruction to an electronic message which has been sent or is to be sent, this instruction enabling provision of the sending of the notification on the receipt of an incoming reply message to this sent electronic message. The message server further includes a checking facility, which is set up to check the incoming electronic message, the check enabling it to be determined whether an incoming electronic message is a reply message to a previously sent electronic message equipped with a instruction. The message server is set up in such a way that, in the event of a positive result of the check, the notification message is sent. The use of such a message server allows the sending of a notification message to be restricted to those cases where the incoming message is a reply message to selected sent messages. Thus, for an electronic message which has been sent or is to be sent, it can be determined whether a notification message will be sent if a reply arrives to this—e.g. important—electronic message. With selective notification like this, it is possible to dispense with the requirement to be informed about every incoming electronic message, without missing an important reply message.

The object is further achieved with a method for notification of a user about the delivery of an electronic message, a notification message being sent to the user upon delivery of an electronic message. For this, in a first step an electronic message is created, in a second step the created electronic message is allocated a instruction for notification about a future incoming reply message, and in a third step the electronic message is sent. After this, in a fourth step a further electronic message is received, this received further electronic message being checked in a fifth step to establish whether this is a reply message to the message which was sent equipped with the instruction, and in a sixth step, if the result of the check in the fifth step is positive, a notification corresponding to the instruction is sent. The third step can also occur before the second step, for example. By the use of this method, it is possible to specify for each sent electronic message whether a notification should follow for incoming reply messages to these electronic message which have been sent or are to be sent. The number of notification messages to be sent is thus reduced, without a reply message to a previously sent and correspondingly flagged (e.g. important) electronic message being missed.

Advantageous developments of the message server according to the invention are specified in the dependent claims. The features and advantages thereby disclosed apply analogously to the method according to the invention too.

If the electronic message is an email message, it can be determined in a particularly secure manner whether an incoming electronic message is a reply message to this email message. To tell whether the incoming electronic message is a reply message to a previously sent electronic message, the checking facility is advantageously set up to compare at least part of the subject line of the sent electronic message with at least part of the subject line of the reply message. This is advantageous because it has emerged that the reply messages to sent email messages often have the same subject line, possibly extended with a note such as "Reply:" or "Re:". Fax messages in unified messaging systems are often stored or managed with a subject line relating in the case of outgoing messages to the recipient's call number, and in the case of incoming fax messages to the sender's call number. These call numbers for reply messages are often identical to the sent messages.

Alternatively or additionally, the checking facility is advantageously set up to compare at least one addressee of the sent electronic message with a sender entry of the received electronic message, so that it is equally possible to deduce whether a received electronic message is a reply message or not.

A further advantageous method can be used for checking whether an incoming electronic message is a reply message, if the checking facility is developed to compare at least part of a body text of the sent electronic message with at least part of a body text of the received electronic message. In the example of email messages, this makes use of the fact that reply messages to email messages often include a copy of the text originally sent. In addition, electronic messages are frequently equipped with unique identification numbers, which are commonly inserted by a sending message server in a "header" (often also called an Internet header). If these identification numbers are copied into the reply message when a reply is generated, they are a part of the body text, which is not generally displayed but is still a very good decision-making basis for the checking.

Advantageously, all the disclosed comparison methods can be combined with each other, and the results of the individual checking steps can be added up. If this sum exceeds a previously specified value, it is assumed that a reply message is present.

The nature of the notification (notification medium, communication address for the notification) can be preset separately for each sent electronic message, and/or the reply messages to be allocated to these can be set separately, in that the instruction allocated to the sent electronic message includes details of the nature of the notification and/or a destination communication address for the notification.

It is advantageous if an electronic real-time message, for example a phone call or an SMS message, is used as the notification message. It is thereby ensured that the user is notified almost immediately.

The person to be notified is likely to be easily reached if the notification facility is set up to generate an automatic phone call to a user as a notification message. On the other hand, a notification is often found less annoying if the notification facility is set up to generate and send a text-based message as a notification message. This text-based message is an SMS message or an email message. In the case of the SMS message, the user can be reached immediately via his mobile phone or another phone with an SMS facility, while if an email message is used, the notification can go to a further email address of the user or of another user, without the complete delivered message having to be forwarded, as is the case with the known forwarding function of current email programs. It may be desirable for a user to not just be informed that a message has been delivered, but also to be sent further information about the reply message. For this, it is advantageous if the notification message includes at least part of a subject line and/or of a body text of the reply message.

Especially flexible handling of the notifications ensues if the allocation means is set up to allocate and/or change the instruction before sending, during sending and/or after sending of the message that is sent. For this, a user can input, change or cancel his notification request at any time, including after the message has been sent. This is especially advantageous if the message server is an email server or a unified messaging system, because a user can thus set instructions for the notification for his most used communication paths.

BRIEF DESCRIPTION OF THE DRAWINGS

Embodiments of a message server according to the invention are explained below with reference to the drawings. They serve at the same time to explain an embodiment for the method according to the invention.

The single FIGURE schematically represents an arrangement of a message server, two computers and communication terminals in public communications networks.

DETAILED DESCRIPTION OF INVENTION

The FIGURE shows a message server NS, which is set up for sending, receiving and temporarily storing electronic messages N, A. The message server NS in the present embodiment is a server of a unified messaging system, which is developed for processing electronic messages for various electronic media (here: SMS, email, fax, voice messages). The message server NS has a transmission facility SE and a receiving facility EE, which are equipped with corresponding modules (not shown) for sending and receiving the different types of message. For storing copies of the sent messages and for temporarily storing the received messages, the message server NS further has a database DB (memory device). In contrast to the conventional servers in unified messaging environments, the message server NS has further modules (software modules) for the allocation of notification instructions to stored (sent) electronic messages, namely the allocation means ZM, and a notification facility BE.

The message server is set up to exchange the messages and other data with communication terminals, which are assigned to the individual users. Shown in the FIGURE as communication terminals are the computers AB, EM ("sender", "receiver"), the landline telephone FNT, which is part of a public communications network ISDN, and the mobile phone MT of the public radio network GSM. These communication terminals AB, EM, FNT, MT are representative examples of any selection from a wide range of communication terminals.

The sending and receiving of the messages N, A is discussed as an example below. The messages N, A are shown in the FIGURE with arrows, the direction of the arrow giving the direction of transmission of the useful content of the respective message. The same applies to the notification messages BN1, BN2, BN3. The signaling and protocol elements to be exchanged for the sending and receiving of the messages N, A and of the notification messages BN1, BN2, BN3 conform to the usual standard for the respective transmission medium, and for reasons of clarity are not further considered.

It should further be noted that in this embodiment the sending of an email message as an electronic message and the receiving of just such an email message as a reply message is discussed. With the arrangement shown and the method as explained, other electronic messages can also be processed analogously. Thus in particular it is possible to send and receive fax messages with the presented unified messaging system, these fax messages being managed in a similar way to the email messages and thus being accessible for the method as described.

A user of the computer AB sends an electronic message N (email message) to another user with the computer EM. For this, the ready-edited electronic message N is transmitted from the computer AB to the message server NS, received there by the receiving facility EE, and temporarily stored in the database DB. The temporarily stored electronic message N is then transmitted by the transmission facility SE, right away or at a later time, to the computer EM, where it is displayed or further processed. Naturally, between the message server NS and the computer EM there can be further message servers NS or other servers and network elements, which process the electronic message N according to the "store-and-forward" principle. In particular, it is also possible that the electronic message N is temporarily stored in the message server NS or in a further server until the user at the computer EM or another communication terminal causes the temporarily stored electronic message N to be retrieved.

The user of the computer AB has used a communications program, a so-called email program, for sending the electronic message. In addition to a standard functional range, this email program is equipped with an input option for entering a instruction. In the simplest case described here, this input means consists of a graphic display box, which can be activated ("clicked") for the cases when the user of the computer AB or of the email program wants a notification in the event that a reply message to the sent electronic message N arrives in the message server NS. The email program further includes input means with which the user can specify his instruction more precisely, for example for input of a communication address to which a notification message BN1, BN2, BN3 should be sent for the notification. These user—specific settings can either be applied generally for all electronic messages N which are equipped with a corresponding instruction and sent, or—as in the present embodiment—be allocated separately for each electronic message N.

If the corresponding notification instruction is input at the time when the electronic message N is created, this instruction is also transferred together with the electronic message N from the computer AB to the message server NS, and there passed to the allocation means ZM. However, it is also possible to allocate such a instruction retrospectively to an electronic message N which has already been sent and temporarily stored (archived) in the database. It is likewise possible to change or cancel a previously assigned instruction retrospectively by a corresponding access to the allocation means ZM and thus to the database DB. The sent electronic messages N are archived as "copies"in the database DB, as previously mentioned. For this, each electronic message N consists of a series of separately stored data fields, which include the sender address, the recipient address (here: "N"), a data field for the subject ("subject line"), the body text of the electronic message N, and possibly electronic file attachments. For the purposes of the notification, at least one further data field is stored with each electronic message N, namely a so-called "flag", which when activated (field content: logical 1) indicates the existence of such a instruction. Further additional data fields relate to one or more communication addresses as destination for the notification, and possibly to further entries, e.g. about the notification medium (phone call, SMS message, etc.). All these additional data fields are managed according to the instruction by the allocation means ZM.

The notification facility BE includes a checking facility (not shown). This undertakes an input check of all incoming electronic messages, at least in the case when at least one sent electronic message N in the database DB is equipped with a notification instruction. In this context the electronic message A which is directed from the computer EM to the message server NS is considered below. The notification facility BE checks whether the electronic message A is a reply message to the electronic message N, of which a copy equipped with a instruction is stored in the database DB.

For the check, various facts can be evaluated individually or in combination with one another; in the simplest case, a single match can lead to a positive result for the check. However, to ensure a reliable detection, several criteria are checked in this embodiment, of which the majority must be met in order for an interpretation as a positive check result. For this, individual data fields of the received electronic message A are each compared here with individual data fields of the stored electronic message N. Every comparison gives a degree of matching, which can be expressed as a percentage between 0 and 100, for example. The percentages achieved in the individual steps of the check are weighted and then added up, the result of the check being rated as positive when a limit value (for example 200) is exceeded, and a notification to the sender of the electronic message N thus being triggered by the notification facility BE.

In the present case, the notification facility BE first checks whether the sender of the electronic message A is at least one of the recipients of the electronic message N. In the example of the email addresses, this is done using the email addresses; for fax messages, the fax number is evaluated, for example. For the email messages, in each case the subject lines of the electronic messages N, A are further compared, the subject lines not usually entirely matching each other because reply messages often have a subject line corresponding to that of the received electronic message N but prefixed with a note such as "Re:" ("Reply:"). A match is therefore assumed here if a certain fraction of contiguous and "significant" alphanumeric characters of the relevant subject lines match. For example, the reply message to a message "Hello" is often "Re: Hello", which is interpreted as a 100% match of the significant part. Alternatively, a certain number (for example 20), i.e. a predefined absolute value, of contiguous alphanumeric characters of the relevant subject line can also match. The method likewise utilizes the fact that for reply messages in the case of email messages, the body text of the original message is often attached to the body text of the reply in the form of a "quote". For the comparison of the body texts, any quote marks (e.g. a right arrow with a space) are first removed in this case from the body text of the reply message, before a comparison is made.

In addition, electronic messages are frequently equipped with unique identification numbers, which are commonly inserted by a sending message server NS in a "header" (often also called an Internet header). If these identification numbers are copied into the reply message when a reply is generated, they are a very good decision-making basis for the checking.

By the "ranking" described above, it was now found that the electronic message A is in fact a reply message to the electronic message N, so that the notification facility BE now arranges a notification according to the instruction by means of the transmission facility SE. The user who sent the electronic message N has specified that an SMS should be sent to his mobile phone MT as notification, and that the SMS message used for this, i.e. the notification message BN2, should contain the first forty characters of the subject line of the reply message A and an advice such as "Reply message arrived!". Alternatively, a notification can naturally also be sent with a different electronic real-time message, namely a so-called "user outcall", i.e. an electronically generated phone call (notification message BN3), to the landline telephone FNT. The notification message BN1, on the other hand, represents an email message which is sent to another email address of the user, e.g. a private address. It represents a compromise between an immediate notification on the one hand, and a less intrusive notification on the other hand.

Naturally, a instruction can also include time criteria, which take into account a user's varying availability at different times of day or similar, so that a different one of the notification messages BN1, BN2, BN3 is sent according to the time/day of the week.

The invention claimed is:

1. A message server for processing outgoing and incoming electronic messages, comprising:
    a transmission facility for sending electronic messages;
    a receiving facility for receiving electronic messages;
    a notification facility for sending a notification message about the receipt of electronic messages;
    an allocation means for allocating an instruction to an electronic message which has been sent or is to be sent, wherein the instruction enables provision of the sending of a notification message on the receipt of an incoming reply message to the sent electronic message; and
    a checking facility for checking incoming electronic messages to determine whether an incoming electronic message is a reply message to a previously sent electronic message which is equipped with an instruction, and
    wherein the notification facility sends a notification message in the event of a positive result by the checking facility that the incoming electronic message is a reply message to a previously sent electronic message which is equipped with an instruction.

2. The message server as claimed in claim 1, wherein the first electronic message is an email message.

3. The message server as claimed in claim 1, wherein the checking facility compares at least a portion of the subject line of the sent electronic message with at least a portion of the subject line of the received electronic message.

4. The message server as claimed in claim 1, wherein the checking facility compares at least one addressee of the sent electronic message with a sender entry of the received electronic message.

5. The message server as claimed in claim 1, wherein the checking facility compares at least a portion of a body text of the sent electronic message with at least a portion of a body text of the received electronic message.

6. The message server as claimed in claim 1, wherein the instruction includes a destination address for the notification message.

7. The message server as claimed in claim 6, wherein the destination address for the notification is different than an address of a sender of the sent electronic message.

8. The message server as claimed in claim 1, wherein the notification message is an electronic real-time message.

9. The message server as claimed in claim 1, wherein the instruction includes information to generate a phone call to a user as a notification message.

10. The message server as claimed in claim 1, wherein the instruction includes information to send a text-based message to a user as a notification message.

11. The message server as claimed in claim 10, wherein the text-based message is an SMS message or an email message.

12. The message server as claimed in claim 11, wherein the notification message includes at least a portion of a subject line of the reply message.

13. The message server as claimed in claim 1, wherein the notification message includes at least a portion of a body text of the reply message.

14. The message server as claimed in claim 1, wherein the message server is an email server or a unified messaging system.

15. A method for notification of a user about the receipt of a reply electronic message, comprising:
    creating an electronic message;
    allocating, to the created electronic message, an instruction for notification about a future incoming reply message;
    sending the created electronic message, the sent electronic message including the instruction;
    receiving an electronic message;
    checking the received electronic message to determine whether it is a reply message to the sent electronic message which included the instruction; and
    if the result of the check is positive, sending a notification message to a user that the received electronic message is a reply message to the previously sent electronic message which is equipped with the instruction.

16. The method as claimed in claim 15, wherein the instruction includes a time of day information such that the notification message is sent to different addresses based on the time of day.

17. The method as claimed in claim 15, wherein the instruction includes information to generate a phone call or to send a text-based message to an address of the user.

* * * * *